Jan. 8, 1952     H. F. STONE ET AL     2,581,774
METHOD AND APPARATUS FOR PRODUCING VALVE STEMS
Filed Sept. 15, 1947
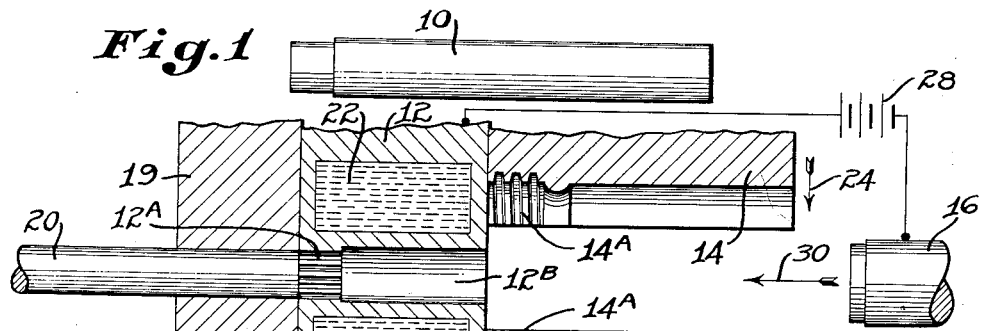
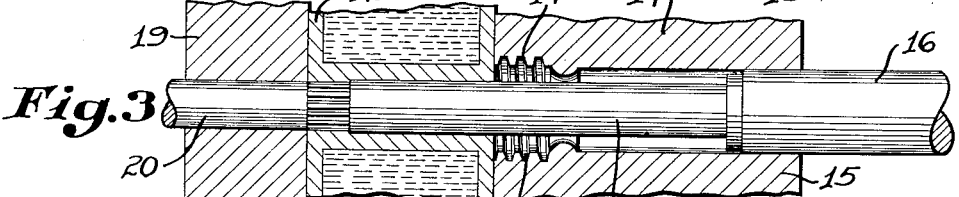
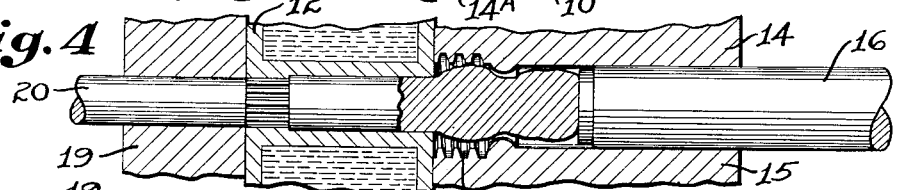
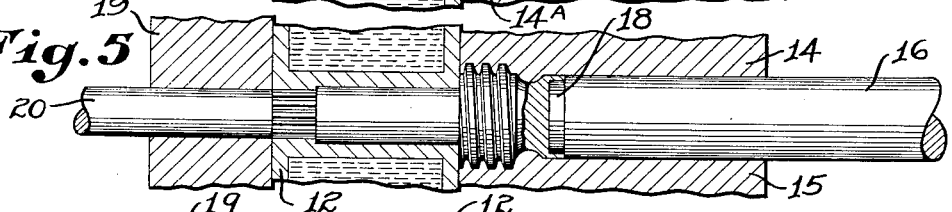
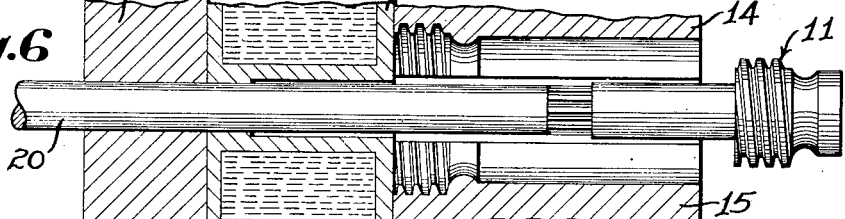
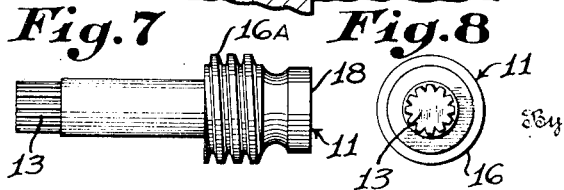
Inventor
HARRY F. STONE.
HARRY L. GIBSON.
By Lyon & Lyon
Attorneys Patented Jan. 8, 1952

2,581,774

UNITED STATES PATENT OFFICE 2,581,774

METHOD AND APPARATUS FOR PRODUCING VALVE STEMS

Harry F. Stone and Harry L. Gibson, Los Angeles, Calif.

Application September 15, 1947, Serial No. 774,166

12 Claims. (Cl. 219—3)

The present invention relates to a new method and apparatus for producing valve stems useful, for example and not as a limitation, in household water faucets.

It has been customary, in the past, to use machining operations in the fabrication of valve stems by which the valve stem body, of originally large dimensions, had much of its metal removed in the formation of its conventional component parts, namely: the fluted end arranged for co-operation with the usual hand wheel subsequently mounted thereon, the acme threaded portion arranged for screw threaded engagement in the valve body, and the reentrant end portion arranged to house and secure therein a washer member for providing a water seal with the valve seat on the valve body.

This prior practice using machining operations results in much scrap metal especially since the circular portion thereof carrying the acme screw thread is of greater diameter than other portions of the valve stem. Consequently, much time of a skilled machinist is required and the operation as a whole is relatively expensive especially because the original stock material of relatively large diameter is purchased in accordance with its weight and the finished product weighs a relatively small fractional part of the original stock from which it is fabricated.

It is therefore an object of the present invention to provide an improved method and apparatus whereby valve stems may be produced more inexpensively than is the case with present day practice.

Another object of the present invention is to provide an improved method and apparatus whereby valve stems may be produced more speedily with less skilled craftsmen than is possible with present day methods and apparatus.

Still a further object of the present invention is to provide an improved method and apparatus for making valve stems in which substantially all of the original stock material is present in the fabricated valve stem whereby the amount of scrap material is relatively small.

Yet another object of the present invention is to provide an improved method and apparatus arranged to produce an enlarged screw threaded portion on original stock material of reduced diameter.

Still another object of the present invention is to provide an improved method and apparatus whereby a valve stem has formed thereon its conventional enlarged screw threaded portion and its conventional recessed end arranged to house a washer member, all in one operation.

Yet a further object of the present invention is to provide an improved method and apparatus whereby a conventional valve stem has formed thereon essentially all of its parts, all in one operation.

Still another object of the present invention is to provide an improved method and apparatus whereby a conventional valve stem may have its screw thread of enlarged diameter formed in original cylindrically shaped stock material while maintaining it from rotation about its longitudinal axis, a subsidiary object being that the means whereby such rotational movement is prevented results in a useful structure on the valve stem, namely, the fluted end arranged to cooperate in locking engagement with the manually operable control knob of the valve.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows a view in side elevation of original cylindrical stock material of brass which is fabricated in accordance with our novel method and apparatus outlined in Figures 2–6 inclusive to form the conventional type of valve stem shown in Figures 7 and 8.

Figure 2 shows an assemblage of elements embodying the present invention for practising our novel method in position for reception of the stock material shown in Figure 1.

Figure 3 shows the same assemblage of elements shown in Figure 2 but with the right hand split die members moved in the direction indicated by the arrows in Figure 2 to closed position and with the right hand die member moved into position in the direction indicated by the horizontal arrow in Figure 2 to cause the original stock material now inserted to be fluted.

Figure 4 shows the right hand horizontally movable die member in a more advanced position than that shown in Figure 3 to cause the heated original stock material to be forced into the acme screw thread dies of diameter larger than the original stock material.

Figure 5 shows the right hand horizontally movable die member in its most advanced position wherein it causes screw threads to be formed on the originally stock material as well as a cylindrical reentrant housing on its end for a washer member.

Figure 6 shows the manner in which the fabricated valve stem is removed from the assembly.

Figure 7 is a view in side elevation of a valve stem of conventional structure fabricated in accordance with the present method and apparatus.

Figure 8 is a view in end elevation of the same valve stem shown in Figure 7.

Explaining the drawing in greater detail, the apparatus shown therein includes besides the original stock material 10 and fabricated valve stem 11: a fluting die member 12 arranged to form flutes 13 on the end of the fabricated valve stem 11; a split die member 14, 15 arranged to form the acme screw-threaded portion 16A of enlarged diameter; a combination die and plunger member 16 arranged to press a heated portion of the original stock material 10 into the split die member 14, 15 as well as to form the reentrant end portion 18 within which, in use, a washer member (not shown) is at least partially housed; and a guide member 19 for a second plunger 20 which is useful not only as an abutment against which the stock material may be pressed by the other plunger 16 but also as a means whereby the fabricated valve stem 11 may be removed from the die members as indicated in Figure 6.

Preferably the fluting die member 12 which has the hardened cutting die elements 12A and combination circular guide and electrical contact portion 12B is cooled as, for example, by passing cooling water 22 through its hollow wall construction.

The split die member halves 14, 15 are of the compression type and are movable in the direction indicated by the vertical arrows 24, 25 in Figure 2 to aligned position with the fluting die member 12 along the longitudinal axis of the original stock material 10. The reason for splitting the die 14, 15 is to allow removal of the fabricated valve stem 11 and perhaps also to facilitate insertion of the original stock material 10 into the circular portion 12B of the fluting die member 12. Although, we prefer to make the die member 14, 15 in the form of split halves it is conceivable that it may be made solid and the finished valve stem 11 screwed out of it; and, in such case it would be necessary initially to remove the fluting die member 12 from engagement with the fluted end 13 to allow the finished valve stem to turn within the die member 14, 15.

While we prefer to make the member 16 as a combination die and plunger member, the member 16 may serve merely as a plunger member to press the heated stock material up into acme screw threaded impression die faces 14A without forming the washer housing 18 in the end of the valve stem.

Preferably, the heating of the original stock material is localized in a region within the die member 14, 15 by water cooling the fluting die member 12 and by passing heating current as indicated schematically in the drawings from voltage source 28. In such case heating current flows from source 28 through die member 12, through material 10 and plunger 16 through the original stock material only so long as the original stock material 10 is properly positioned in the fluting die 12 and the plunger member 16 contacts the material. The amount of heating current necessarily increases when the contact resistance between the material 10 and the die member 12 is lessened as is the case when the die projections 12A are securely lodged in the material after the fluting operation. Thus, the fluting die projections 12A serve not only as a means permitting high heating currents to flow through the material 10 but also as a means for preventing rotational movement of the material about its longitudinal axis when the enlarged screw threaded portion 16A is formed thereby assuring a screw threaded portion suitable for subsequent use.

Other means, for example, high frequency induction heating, may be used for producing localized heating in the material 10 preparatory to the forming operation shown in Figure 4. For example, the induction heating coil (not shown) may be arranged concentric with the end of the original stock 10 protruding from the die member 12 with the die members 14, 15 moved substantially outside of the magnetic field of such induction heating coil. In such case, after the stock 10 is heated the coil is removed, the die members 14, 15 are moved to closed position and the plunger 16 moved in the direction indicated by the arrow 30 to initially flute the left hand end of the original stock and to form the screw threaded portion 16A and reentrant end portion 18. In other words, the operations are again as indicated in Figures 3, 4, 5 and 6 which, in order, indicate the progressive steps.

While the drawings themselves indicate rather clearly the steps involved in producing a finished or fabricated valve stem 11 from original round stock 10, the successive steps in the operation of one new system may be outlined as follows. The original round material 10 is manually partially inserted in the fluting die 12, within which it is maintained by the cylindrical portion 12B. Then the split die member 14, 15 is moved to closed position in the direction indicated by the arrows 24, 25 and the plunger 16 moved in the direction indicated by the arrow 30. Thereafter, initially the original stock material 10 is moved all the way into the fluting die 12 to cut flutes therein which serve to minimize the electrical contact resistance between die member 12 and material 10 and also serves to prevent subsequent rotational movement of the material thus assuring the formation of a suitable enlarged screw threaded portion. At this point increased heating current flows through the material and it becomes sufficiently plastic to be swaged by the movable plunger into the impression die 14, 15, and also to have formed therein the reentrant washer housing 18. After this the plunger is withdrawn, thus automatically interrupting the flow of heating current, the fabricated valve stem 11 is allowed to cool, the die members 14, 15 are separated and the valve stem is then ejected as indicated in Figure 6.

It is quite apparent that many different means may be employed to produce the desired movement of the die members 14, 15 and the right hand and left hand plunger means. Hydraulically operated means for this purpose may be most desirable because of the relatively high pressure exerted on the stock material 10 in its fabrication into the valve stem 11.

A central longitudinally extending tapped hole of conventional nature may be subsequently machined in the reentrant end portion 18 for securing a conventional washer (not shown) within the reentrant end portion 18.

While I have shown and described herein my preferred embodiment wherein a threaded portion or a partially threaded portion 16A is formed in the swaging or forming operation it is also within the province of the present invention to initially form only the portion of enlarged diameter during the swaging process and then subsequently to cut the acme screw thread thereon by a conventional machine lathe operation.

Also, it is apparent that when the valve stems are heated by induction heating either the induction heating coil may be moved away from proximity to the valve stem or the valve stem may be moved away from proximity to the heating coil.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In the method of manufacturing valve stems having a screw threaded portion thereon of enlarged diameter from original stock material of reduced diameter, the steps comprising; fluting one end of said stock material, heating an intermediate portion of said material to render said intermediate portion plastic, and then squeezing said plastic portion into the shape of said screw threaded portion of enlarged diameter while maintaining said stock material from rotating about its longitudinal axis by the fluting formed thereon.

2. In the method of manufacturing valve stems having a screw threaded portion thereon of enlarged diameter from original stock material of reduced diameter, the steps comprising; initially fluting one end of said original stock material, heating said stock material in a region remote from the fluted end thereof, and then swaging said original stock material in said region to form said screw threaded portion of enlarged diameter while maintaining said stock material from rotating about its longitudinal axis by the fluting formed thereon.

3. In the method of manufacturing valve stems having a fluted end, a screw threaded portion thereon of enlarged diameter and a reentrant end portion arranged to partially house a washer member, from original stock material of reduced diameter, the steps comprising; fluting one end of said original stock material, and then swaging said original stock material to form said screw threaded portion of enlarged diameter and to form said reentrant end portion while maintaining said stock material from rotating about its longitudinal axis by the fluting formed thereon.

4. In the method of manufacturing valve stems having a fluted end and a screw threaded portion thereon of enlarged diameter from original stock material of reduced diameter, the step comprising; initially fluting the end of the material, then heating said material in a region remote from the fluted end of said stock material, and then subsequently swaging said region of the stock material to form said screw threaded portion while maintaining said stock material from rotating about its longitudinal axis by engagement with the fluting formed thereon.

5. In the art of manufacturing a valve stem having a fluted end and a screw threaded portion thereon of enlarged diameter from original stock material of reduced diameter, the combination of; a fluting die member, a split die member arranged to form said screw threaded portion, said fluting die member and split die member being aligned along the axis of said valve stem, and a plunger member arranged to move along said axis to initially press said stock material into said fluting die member and to subsequently swage said stock material into said split die member.

6. In the art of manufacturing valve stems having a fluted end and a screw threaded portion thereon of enlarged diameter, the combination of; a water cooled fluting die member, a split die member arranged to form said screw threaded portion and aligned with said fluting die member, means arranged to heat said valve stem in the portion thereof arranged for disposition adjacent said split die member, and means arranged to press said heated portion into said split die member while the valve stem is firmly held in the fluting die.

7. The invention defined in claim 5 characterized by electrical connections to said fluting die member and said plunger member for passing heating current through the valve stem.

8. In the art of manufacturing a valve stem having a fluted end and a screw threaded portion thereon of enlarged diameter, the combination of; a water cooled fluting die member, a split die member arranged to form said screw threaded portion and aligned with said fluting die member along the axis of said valve stem, a plunger member arranged to move along said axis to initially press said stock material into said fluting die member and to subsequently swage said stock material into said split die member, and electrical connections to said fluting die member and said plunger member arranged to pass heating current through said valve stem.

9. In the art of manufacturing a valve stem having a fluted end, a reentrant end portion and a screw threaded portion thereon of enlarged diameter, the combination of; a fluting die member, a split die member aligned with said fluting die member along the axis of said valve stem arranged to form said screw threaded portion, and a combination die member and plunger arranged to press the valve stem material into said fluting die member, into said split die member and to form said reentrant end portion.

10. In the art of manufacturing a valve stem having a fluted end and a screw threaded portion thereon of enlarged diameter, the subcombination including, a fluting die member, and a split die member aligned with said fluting die member along the axis of said valve stem and arranged to form said screw threaded portion of enlarged diameter.

11. In the method of manufacturing valve stems having a portion thereon of enlarged diameter from original stock material of reduced diameter, the steps comprising; fluting one end of said stock material, heating an intermediate portion of said material to render said intermediate portion plastic, and then squeezing said plastic portion into the shape of said portion of enlarged diameter while maintaining said stock material from rotating about its longitudinal axis by the fluting formed thereon.

12. In the art of manufacturing articles having a screw threaded portion thereon of enlarged diameter from the original stock material of reduced diameter, the combination of: a member arranged to engage a portion of said original stock material of reduced diameter to prevent it from rotating about its longitudinal axis, a split die member arranged to form said screw threaded portion, said engaging and rotation preventing member and said split die member being aligned along the axis of said stock material, and a plunger member arranged to move along said axis to initially press said stock material into engagement with said rotation preventing member and to subsequently swage said stock material into said split die member.

HARRY F. STONE.
HARRY L. GIBSON.

REFERENCES CITED

The following references are of record in the file of this patent:

UNITED STATES PATENTS

| Number | Name | Date |
|---|---|---|
| 329,286 | Dalzell | Oct. 27, 1885 |
| 1,259,275 | Murray | Mar. 12, 1918 |
| 1,692,488 | Daunell | Nov. 20, 1928 |
| 2,393,130 | Toulmin | Jan. 15, 1946 |

FOREIGN PATENTS

| Number | Country | Date |
|---|---|---|
| 247,602 | Great Britain | Feb. 15, 1926 |